US008710875B2

(12) United States Patent
Bai et al.

(10) Patent No.: US 8,710,875 B2
(45) Date of Patent: Apr. 29, 2014

(54) BOOTSTRAP GATE DRIVER

(75) Inventors: Yong-Jiang Bai, Nanjing (CN);
 Qiao-Liang Chen, Nanjing (CN);
 Ning-Bin Wang, Nanjing (CN); Ju-Lu Sun, Nanjing (CN)

(73) Assignees: FSP Technology Inc., Taoyuan County (TW); FSP-Powerland Technology Inc., Nanjing (CN)

( * ) Notice: Subject to any disclaimer, the term of this patent is extended or adjusted under 35 U.S.C. 154(b) by 0 days.

(21) Appl. No.: 13/474,737

(22) Filed: May 18, 2012

(65) Prior Publication Data
 US 2012/0293219 A1  Nov. 22, 2012

(30) Foreign Application Priority Data
 May 18, 2011  (CN) .................... 2011 2 0158231 U

(51) Int. Cl.
 *H03B 1/00* (2006.01)
 *H03K 3/00* (2006.01)
(52) U.S. Cl.
 USPC ........... 327/109; 327/110; 327/111; 327/112; 323/284
(58) Field of Classification Search
 USPC .................. 327/108–112, 379, 389, 391; 326/22–27, 81–87
 See application file for complete search history.

(56) References Cited

U.S. PATENT DOCUMENTS

| | | | |
|---|---|---|---|
| 5,705,919 A * | 1/1998 | Wilcox ......................... 323/282 |
| 7,301,376 B2 * | 11/2007 | Capodivacca et al. ........ 327/112 |
| 7,679,341 B2 * | 3/2010 | Chen ............................. 323/224 |
| 7,710,167 B2 * | 5/2010 | Bernacchia ................... 327/108 |
| 8,207,714 B2 * | 6/2012 | Chen ............................. 323/224 |
| 2006/0017466 A1 * | 1/2006 | Bryson .......................... 326/88 |
| 2007/0046275 A1 * | 3/2007 | Shirai et al. .................. 323/284 |
| 2008/0061756 A1 * | 3/2008 | Shirai et al. .................. 323/282 |
| 2008/0100378 A1 * | 5/2008 | Bernacchia ................... 327/589 |
| 2011/0188218 A1 * | 8/2011 | Hsing et al. .................. 361/772 |
| 2012/0062281 A1 * | 3/2012 | Briere et al. ................. 327/109 |
| 2012/0286365 A1 * | 11/2012 | Hosokawa et al. ........... 257/369 |

* cited by examiner

*Primary Examiner* — Brandon S Cole
(74) *Attorney, Agent, or Firm* — Jianq Chyun IP Office

(57) ABSTRACT

A bootstrap gate driver including a load indication unit, a bootstrap gate-drive unit and a drive-control unit is provided. The load indication unit is configured to generate a load indication signal in response to a state of a load. The bootstrap gate-drive unit is configured to drive a switch-transistor circuit in response to an inputted pulse-width-modulation (PWM) signal, wherein the switch-transistor circuit has a high-side driving path and a low-side driving path. The drive-control unit is coupled to the load indication unit and the bootstrap gate-drive unit, and configured to enable or disable the high-side driving path in response to the load indication signal. In the invention, the operation of the low-side driving path is not affected by enabling or disabling the high-side driving path.

14 Claims, 4 Drawing Sheets

BOOTSTRAP GATE DRIVER

CROSS-REFERENCE TO RELATED APPLICATION

This application claims the priority benefit of China application serial no. 201120158231.7, filed on May 18, 2011. The entirety of the above-mentioned patent application is hereby incorporated by reference herein and made a part of this specification.

BACKGROUND OF THE INVENTION

1. Field of the Invention

The invention generally relates to a power conversion field, in particular, to a bootstrap gate driver applied in a synchronous rectification circuit/application.

2. Description of Related Art

There are two types of rectification strategies in the power conversion field, one type is diode rectification, and the other type is synchronous rectification. Diode rectification is performed based on the conduction of diodes. Synchronous rectification is performed by usually using a gate driving signal to control the operation (i.e. turned on or off) synchronous rectifiers (SRs). Synchronous rectifiers are usually implemented by MOSFETs. For low-voltage and large-current power conversion application, the forward bias (Vf) of diodes cannot be further reduced due to the characteristic of diodes, so the power loss is higher; and on the other hand, the on-resistor (Rds-on) of each synchronous rectifier is smaller, so the power loss is lower compared with diode rectification. Therefore, the conversion efficiency of the power conversion can be increased due to the power loss of synchronous rectifiers is lower.

There are conduction loss, driving loss, switching loss and body diode loss in the operating region of synchronous rectifiers. When the load is in the heavy-loading state, the load current becomes larger and makes the conduction loss become the main part of loss. When the load is in the light-loading state, the load current is small, such that the switching loss and driving loss both caused by turning on/off synchronous rectifiers become the main part of loss.

Compared with diode rectification, the saved power of synchronous rectification is lower, and the power loss related to synchronous rectification is even higher than that of diode rectification. In this case, a switching of synchronous rectification needs to be stopped/inactivated, and the body diode of the corresponding synchronous rectifier is used to perform diode rectification. Moreover, the body diode can cut off the negative reactive current loop when the load is in the light-loading state, such that inductive loss and driving loss will be significantly reduced, and the light-loading efficiency will be obviously increased.

However, the current synchronous rectification may be implemented by a couple of synchronous rectifiers to be respectively served as a high-side N-type transistor functioned as a rectifier and a low-side N-type transistor functioned as a switch. And, as shown in FIG. 1, a traditional bootstrap gate driver 101 is used to drive the high-side N-type transistor $Q_H$ and the low-side N-type transistor $Q_L$ in response to an inputted pulse width modulation (PWM) signal PWM_I. Since the high-side N-type transistor $Q_H$ and the low-side N-type transistor $Q_L$ are alternately switched by the bootstrap gate driver 101 in response the inputted PWM signal PWM_I, so the high-side N-type transistor $Q_H$ can not be disabled when the load is in the light-loading state by directly turning off the inputted PWM signal PWM_I due to both high-side N-type transistor $Q_H$ and the low-side N-type transistor $Q_L$ are commonly used the inputted PWM signal PWM_I (if the inputted PWM signal PWM_I is turned off, the operation of the low-side N-type transistor $Q_L$ is affected). In other words, a switching of the synchronous rectification is still activated when the load is in the light-loading state, such that the light-loading efficiency will not be effectively increased in case that the traditional bootstrap gate driver 101 is applied in the synchronous rectification application.

SUMMARY OF THE INVENTION

Accordingly, the invention is directed to a bootstrap gate driver in order to solve the problem mentioned in the above "Related Art".

An exemplary embodiment of the invention provides a bootstrap gate driver including a load indication unit, a bootstrap gate-drive unit and a drive-control unit. The load indication unit is configured to generate a load indication signal in response to a state of a load. The bootstrap gate-drive unit is configured to drive a switch-transistor circuit in response to an inputted pulse-width-modulation (PWM) signal, wherein the switch-transistor circuit has a high-side driving path and a low-side driving path. The drive-control unit is coupled to the load indication unit and the bootstrap gate-drive unit, and configured to enable or disable the high-side driving path in response to the load indication signal.

In one exemplary embodiment of the invention, the load indication unit includes a sample circuit and a determination circuit. The sample circuit is configured to detect the state of the load by a means of voltage/current sensing, so as to provide a detection signal. The determination circuit is coupled to the sample circuit, and configured to compare the detection signal with a reference signal, so as to generate the load indication signal.

In one exemplary embodiment of the invention, the switch-transistor circuit includes a high-side transistor corresponding to the high-side driving path and a low-side transistor corresponding to the low-side driving path. The bootstrap gate-drive unit includes a high-side driving circuit, a low-side driving circuit, a bootstrap diode, a bootstrap capacitor and a signal processing unit. The high-side driving circuit is coupled to the high-side transistor, and configured to drive the high-side transistor in response to a first control signal related to the inputted PWM signal. The low-side driving circuit is coupled to the low-side transistor, and configured to drive the low-side transistor in response to a second control signal related to the inputted PWM signal, wherein the first and the second control signals are complementary. An anode of the bootstrap diode is coupled to an output of the drive-control unit. A first terminal of the bootstrap capacitor is coupled to a cathode of the bootstrap diode, and a second terminal of the bootstrap capacitor is coupled between the high-side transistor and the low-side transistor. The signal processing unit is coupled to the high-side driving circuit and the low-side driving circuit, and configured to receive and process the inputted PWM signal, so as to generate the first control signal and the second control signal.

In one exemplary embodiment of the invention, the high-side driving circuit includes a first transistor and a second transistor. A control electrode of the first transistor is configured to receive the first control signal, a first electrode of the first transistor is coupled to the cathode of the bootstrap diode and the first terminal of the bootstrap capacitor, and a second electrode the first transistor is coupled to a gate of the high-side transistor. A control electrode of the second transistor is configured to receive the first control signal, a first electrode of the second transistor is coupled to the second electrode of the first transistor and the gate of the high-side transistor, and a second electrode of the second transistor is coupled to the second terminal of the bootstrap capacitor, a source of the high-side transistor and a drain of the low-side transistor.

In one exemplary embodiment of the invention, the low-side driving circuit includes a third transistor and a fourth transistor. A control electrode of the third transistor is configured to receive the second control signal, a first electrode of the third transistor is coupled to a system power, and a second electrode of the third transistor is coupled to a gate of the low-side transistor. A control electrode of the fourth transistor is configured to receive the second control signal, a first electrode of the fourth transistor is coupled to the second electrode of the third transistor and the gate of the low-side transistor, and a second electrode of the fourth transistor is coupled to a source of the low-side transistor.

In one exemplary embodiment of the invention, the first to the fourth transistors are bipolar junction transistors (BJTs). In this case, the first and the third transistors are NPN-type BJTs, and the second and the fourth transistors are PNP-type BJTs.

In one exemplary embodiment of the invention, the high-side transistor and the low-side transistor are N-type power transistors.

In one exemplary embodiment of the invention, the drive-control unit includes a fifth transistor and a sixth transistor. A control electrode of the fifth transistor is configured to receive the load indication signal, and a first electrode of the fifth transistor is coupled to a ground potential. A control electrode of the sixth transistor is coupled to a second electrode of the fifth transistor, a first electrode of the sixth transistor is coupled to the system power, and a second electrode of the sixth transistor is coupled to the anode of the bootstrap diode, wherein the second electrode of the sixth transistor is served as the output of the drive-control unit.

In one exemplary embodiment of the invention, the drive-control unit further includes a current-limiting resistor coupled between the second electrode of the fifth transistor and the control electrode of the sixth transistor.

In one exemplary embodiment of the invention, the fifth transistor is an N-type transistor, and the sixth transistor is a PNP-type BJT.

In one exemplary embodiment of the invention, when the load is in a light-loading state, the load indication signal is in a low level, such that the fifth and the sixth transistors are turned off, so as to disable the high-side driving path; and when the load is not in the light-loading state, the load indication signal is in a high level, such that the fifth and the sixth transistors are turned on, so as to enable the high-side driving path.

In one exemplary embodiment of the invention, the signal processing unit may include a first series-connected level-shift module and logic module and a second series-connected level-shift module and logic module. The first series-connected level-shift module and logic module is configured to receive and process the inputted PWM signal, so as to generate the first control signal. The second series-connected level-shift module and logic module is configured to receive and process the inputted PWM signal, so as to generate the second control signal.

In one exemplary embodiment of the invention, the provided bootstrap gate driver is at least suitable for a voltage converter such as a boost converter.

From the above, in the invention, the provided bootstrap gate driver applied in the synchronous rectification application is capable of inactivating a switching of the high-side transistor and low-side transistor (i.e. synchronous rectification) when the load is in the light-loading state, such that the light-loading efficiency can be effectively/substantially increased. And, the operation of the low-side driving path is not affected by enabling or disabling the high-side driving path.

In order to make the aforementioned and other features and advantages of the invention comprehensible, several exemplary implementations accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
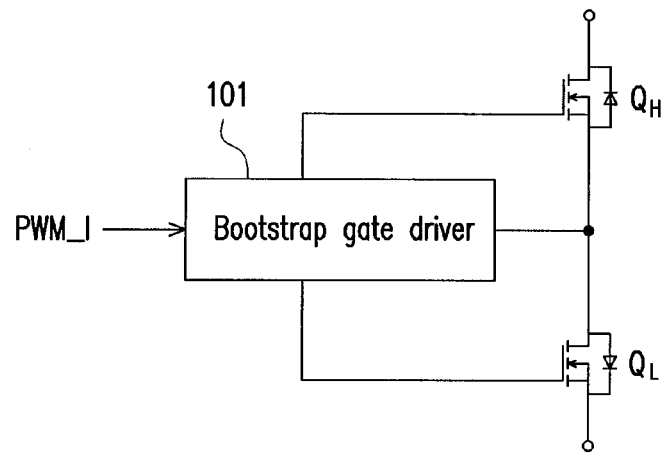
FIG. 1 is a diagram of a traditional bootstrap gate driver for driving a high-side N-type transistor and a low-side N-type transistor in response to an inputted PWM signal.

Reference will now be made in detail to the present preferred embodiments of the invention, examples of which are illustrated in the accompanying drawings. Wherever possible, the same reference numbers are used in the drawings and the description to refer to the same or like parts.

Figure 2:
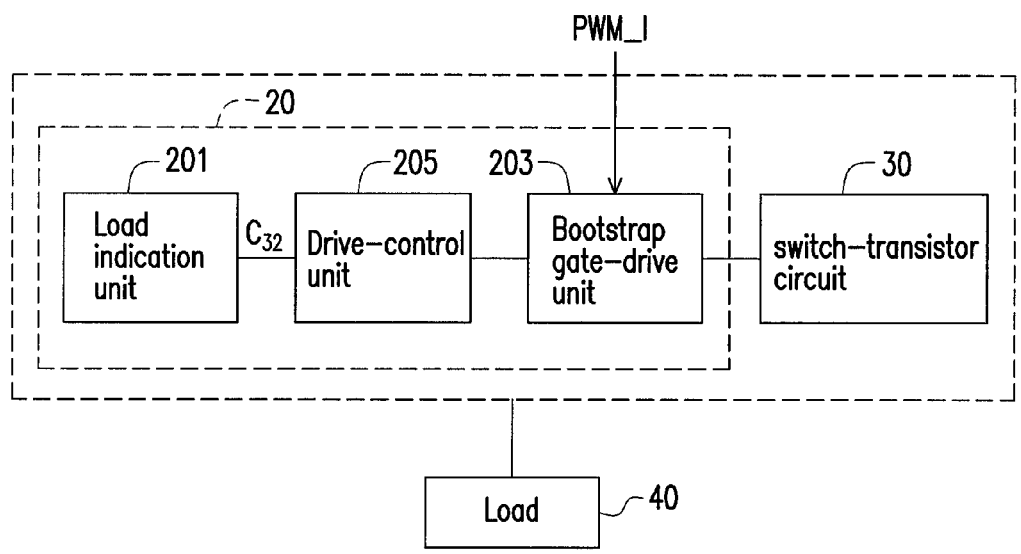
FIG. 2 is a diagram of a bootstrap gate driver according to an exemplary embodiment of the invention.

Based on the demands of high efficiency, reliability and safety of the switching power supply, the invention provides a bootstrap gate driver 20 as shown in FIG. 2. To be specific, FIG. 2 is a diagram of the bootstrap gate driver 20 according to an exemplary embodiment of the invention. Referring to FIG. 2, the bootstrap gate driver 20 includes a load indication unit 201, a bootstrap gate-drive unit 203 and a drive-control unit 205. The load indication unit 201 is configured to generate a load indication signal $C_{32}$ in response to a state of a load 40 (for example, an electronic device, but not limited thereto), where a level of the load indication signal $C_{32}$ represents the state of the load 40, for example, heavy-loading state, light-loading state, or middle-loading state, but not limited thereto.

Figure 3A:
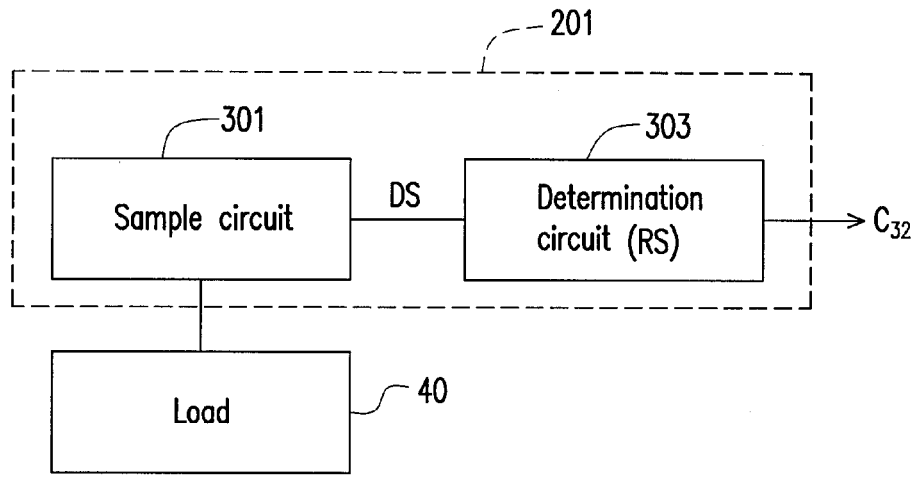
FIG. 3A is an implementation diagram of a load indication unit in the bootstrap gate driver of FIG. 2.

To be specific, FIG. 3A is an implementation diagram of the load indication unit 201 in the bootstrap gate driver 20 of FIG. 2. Referring to FIGS. 2 and 3A, the load indication unit 201 includes a sample circuit 301 and a determination circuit 303. The sample circuit 301 is configured to detect the state of the load 40 by a means of voltage/current sensing, so as to provide a detection signal DS. The determination circuit 303 is coupled to the sample circuit 301, and configured to compare the detection signal DS with a built-in reference signal RS, so as to generate the load indication signal $C_{32}$.

Referring back to FIG. 2, the bootstrap gate-drive unit 203 is configured to drive a switch-transistor circuit 30 in response to an inputted pulse-width-modulation (PWM) signal PWM_I, wherein the switch-transistor circuit 30 has a high-side driving path (loop) and a low-side driving path (loop). Moreover, the drive-control unit 205 is coupled to the load indication unit 201 and the bootstrap gate-drive unit 203, and configured to enable or disable the high-side driving path of the switch-transistor circuit 30 in response to the load indication signal $C_{32}$.

Figure 3B:
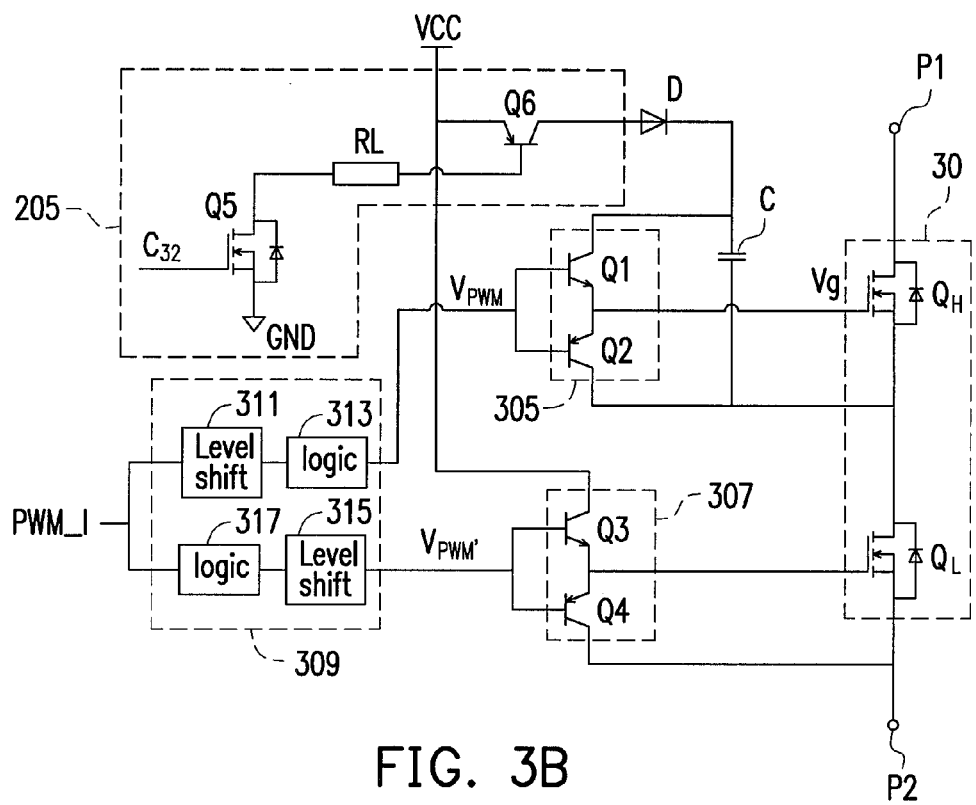
FIG. 3B is an implementation diagram of a bootstrap gate-drive unit and a drive-control unit both in the bootstrap gate driver of FIG. 2.

To be specific, FIG. 3B is an implementation diagram of the bootstrap gate-drive unit 203 and the drive-control unit 205 both in the bootstrap gate driver 20 of FIG. 2. Referring to FIGS. 2 and 3B, in this exemplary embodiment, the switch-transistor circuit 30 may include a high-side transistor $Q_H$ corresponding to the high-side driving path and a low-side transistor $Q_L$ corresponding to the low-side driving path. The high-side transistor $Q_H$ and the low-side transistor $Q_L$ are connected in series between terminals P1 and P2, and may be implemented by N-type power transistors, but not limited thereto.

The bootstrap gate-drive unit 203 may include a high-side driving circuit 305, a low-side driving circuit 307, a bootstrap diode D, a bootstrap capacitor C and a signal processing unit 309. The high-side driving circuit 305 is coupled to the high-side transistor $Q_H$, and configured to drive the high-side transistor $Q_H$ in response to a first control signal $V_{PWM}$ related to the inputted PWM signal PWM_I. The low-side driving circuit 307 is coupled to the low-side transistor $Q_L$, and configured to drive the low-side transistor $Q_L$ in response to a second control signal $V_{PWM}'$ related to the inputted PWM signal PWM_I. In this exemplary embodiment, the first and the second control signals $V_{PWM}$ and $V_{PWM}'$ are complementary.

An anode of the bootstrap diode D is coupled to an output of the drive-control unit 205. A first terminal of the bootstrap capacitor C is coupled to a cathode of the bootstrap diode D, and a second terminal of the bootstrap capacitor C is coupled between the high-side transistor $Q_H$ and the low-side transistor $Q_L$. The signal processing unit 309 is coupled to the high-side driving circuit 305 and the low-side driving circuit 307, and configured to receive and process the inputted PWM signal PWM_I, so as to generate the first control signal $V_{PWM}$ and the second control signal $V_{PWM}'$.

In this exemplary embodiment, each of the high-side driving circuit 305 and the low-side driving circuit 307 may be a totem pole driving circuit, but not limited thereto. In this case, the high-side driving circuit 305 may include transistors Q1 and Q2, and the low-side driving circuit 307 may include transistors Q3 and Q4. The transistors Q1 to Q4 may be implemented by bipolar junction transistors (BJTs), but not limited thereto, such that the transistors Q1 and Q3 are NPN-type BJTs, and the transistors Q2 and Q4 are PNP-type BJTs.

A control electrode (i.e. base) of the transistor Q1 is configured to receive the first control signal $V_{PWM}$, a first electrode (i.e. collector) of the transistor Q1 is coupled to the cathode of the bootstrap diode D and the first terminal of the bootstrap capacitor C, and a second electrode (i.e. emitter) of the transistor Q1 is coupled to a gate of the high-side transistor $Q_H$. A control electrode (i.e. base) of the transistor Q2 is configured to receive the first control signal $V_{PWM}$, a first electrode (i.e. emitter) of the transistor Q2 is coupled to the second electrode (i.e. emitter) of the transistor Q1 and the gate of the high-side transistor $Q_H$, and a second electrode (i.e. collector) of the transistor Q2 is coupled to the second terminal of the bootstrap capacitor C, a source of the high-side transistor $Q_H$ and a drain of the low-side transistor $Q_L$.

A control electrode (i.e. base) of the transistor Q3 is configured to receive the second control signal $V_{PWM}'$, a first electrode (i.e. collector) of the transistor Q3 is coupled to a system power VCC, and a second electrode (i.e. emitter) of the transistor Q3 is coupled to a gate of the low-side transistor $Q_L$. A control electrode (i.e. base) of the transistor Q4 is configured to receive the second control signal $V_{PWM}'$, a first electrode (i.e. emitter) of the transistor Q4 is coupled to the second electrode (i.e. emitter) of the transistor Q3 and the gate of the low-side transistor $Q_L$, and a second electrode (i.e. collector) of the transistor Q4 is coupled to a source of the low-side transistor $Q_L$.

In addition, the signal processing unit 309 may include a first series-connected level-shift module 311 and logic module 313, and a second series-connected level-shift module 315 and logic module 317. The first series-connected level-shift module 311 and logic module 313 is configured to receive and process the inputted PWM signal PWM_I, so as to generate the first control signal $V_{PWM}$. The second series-connected level-shift module 315 and logic module 317 is configured to receive and process the inputted PWM signal PWM_I, so as to generate the second control signal $V_{PWM}'$. Each of the level-shift modules 311 and 315 is configured to regulate/adjust the level of the input voltage, and each of the logic modules 313 and 317 is configured to perform the logic conversion on the input digital signal.

It should be noted that, the level-shift modules 311, 315 and the logic modules 313, 317 are optional. Whether the level-shift modules 311, 315 and the logic modules 313, 317 are used or not is determined by the real design or application requirement.

On the other hand, the drive-control unit 205 may include transistors Q5, Q6 and a current-limiting resistor RL. In this exemplary embodiment, the transistor Q5 is implemented by an N-type transistor, and the transistor Q6 is implemented by a PNP-type BJT, but not limited thereto. In this case, a control electrode (i.e. gate) of the transistor Q5 is configured to receive the load indication signal $C_{32}$ from the load indication unit 201, and a first electrode (i.e. source) of the transistor Q5 is coupled to a ground potential GND.

A control electrode (i.e. base) of the transistor Q6 is coupled to a second electrode (i.e. drain) of the transistor Q5 through the current-limiting resistor RL. In other words, the current-limiting resistor RL is coupled between the second electrode (i.e. drain) of the transistor Q5 and the control electrode (i.e. base) of the transistor Q6. A first electrode (i.e. emitter) of the transistor Q6 is coupled to the system power VCC, and a second electrode (i.e. collector) of the transistor Q6 is coupled to the anode of the bootstrap diode D. In this exemplary embodiment, the second electrode (i.e. collector) of the transistor Q6 may be served/seen as the output of the drive-control unit 205, and the control electrode (i.e. gate) of the transistor Q5 may be served/seen as an input of the drive-control unit 205.

Herein, it should be noted that, in this exemplary embodiment, when the load 40 is in the light-loading state, the load indication signal $C_{32}$ is in a low level, such that the transistors Q5, Q6 are simultaneously turned off, so as to disable the high-side driving path of the switch-transistor circuit 30. Moreover, when the load 40 is not in the light-loading state (for example, in the heavy-loading state, or the middle-loading state, but not limited thereto), the load indication signal $C_{32}$ is in a high level, such that the transistors Q5, Q6 are simultaneously turned on, so as to enable the high-side driving path of the switch-transistor circuit 30.

Herein, the switching of the high-side transistor $Q_H$ and the low-side transistor $Q_L$ is explained as below in case that the load 40 is not in the light-loading state, for example, the heavy-loading state, or the middle-loading state, but not limited thereto.

When the load 40 is not in the light-loading state, the load indication unit 201 would generate the load indication signal $C_{32}$ with high level, so the transistors Q5, Q6 are simultaneously turned on. In this case, the system power VCC can be provided to the anode of the bootstrap diode D and the low-side driving circuit 307, so the charging path of the bootstrap capacitor C can be established. Since the system power VCC can be provided to the anode of the bootstrap diode D and the low-side driving circuit 307, so the high-side driving path and the low-side driving path of the switch-transistor circuit 30 can be enabled in response to the enabling of the high-side driving circuit 305 and the low-side driving circuit 307.

In case that the system power VCC can be provided to the anode of the bootstrap diode D and the low-side driving circuit 307, when the second control signal $V_{PWM}'$ is in the high level, the transistor Q3 is turned on, so the gate of the low-side transistor $Q_L$ is coupled to the system power VCC. In this case, the low-side transistor $Q_L$ would be turned on, and the bootstrap capacitor C is charged by the power system VCC. Moreover, when the second control signal $V_{PWM}'$ is in the low level, the transistor Q4 is turned on, so the gate and the source of the low-side transistor $Q_L$ are coupled with each other. In this case, the low-side transistor $Q_L$ would be turned off.

In case that the system power VCC can be provided to the anode of the bootstrap diode D and the low-side driving circuit 307, when the first control signal $V_{PWM}$ is in the high level, the transistor Q1 is turned on, so the bootstrap capacitor C is coupled across the gate and the source of the high-side transistor $Q_H$. In this case, the high-side transistor $Q_H$ may be turned on in response to the voltage on the bootstrap capacitor C (here, assuming the voltage on the bootstrap capacitor C is greater than the threshold voltage of the high-side transistor $Q_H$). However, if the voltage on the bootstrap capacitor C is controlled to less than the threshold voltage of the high-side transistor $Q_H$, so the high-side transistor $Q_H$ may be turned off. In other words, when the first control signal $V_{PWM}$ is in the high level, whether the high-side transistor $Q_H$ is turned on or not is determined by the voltage on the bootstrap capacitor C.

Moreover, when the first control signal $V_{PWM}$ is in the low level, the transistor Q2 is turned on, so the gate and the source of the high-side transistor $Q_H$ are coupled with each other. In this case, the high-side transistor $Q_H$ would be turned off.

On the other hand, the switching of the high-side transistor $Q_H$ and the low-side transistor $Q_L$ is explained as below in case that the load 40 is in the light-loading state.

When the load 40 is in the light-loading state, the load indication unit 201 would generate the load indication signal $C_{32}$ with low level, so the transistors Q5, Q6 are simultaneously turned off. In this case, the system power VCC can not be provided to the anode of the bootstrap diode D, and it only can be provided to the low-side driving circuit 307, so the charging path of the bootstrap capacitor C can not be established. Since the system power VCC can not be provided to the anode of the bootstrap diode D, so the high-side driving path of the switch-transistor circuit 30 is disabled in response to the disabling of the high-side driving circuit 305, and the low-side driving path of the switch-transistor circuit 30 can be still enabled in response to the enabling of the low-side driving circuit 307.

In case that the system power VCC only can be provided to the low-side driving circuit 307, when the second control signal $V_{PWM}'$ is in the high level, the transistor Q3 is turned on, so the gate of the low-side transistor $Q_L$ is coupled to the system power VCC. In this case, the low-side transistor $Q_L$ would be turned on, but the bootstrap capacitor C can not be charged by the power system VCC at this time due to the charging path of the bootstrap capacitor C can not be established. Moreover, when the second control signal $V_{PWM}'$ is in the low level, the transistor Q4 is turned on, so the gate and the source of the low-side transistor $Q_L$ are coupled with each other. In this case, the low-side transistor $Q_L$ would be turned off. Obviously, the operation of the low-side driving path of the switch-transistor circuit 30 is not affected by enabling or disabling the high-side driving path of the switch-transistor circuit 30.

In case that the system power VCC only can be provided to the low-side driving circuit 307, since the charging path of the bootstrap capacitor C can not be established, so the high-side transistor $Q_H$ is continuously turned off when the load 40 is in the light-loading state. Obviously, when the load 40 is in the light-loading state, the bootstrap gate driver 20 can disable the high-side driving path of the switch-transistor circuit 30, so as to effectively/substantially increase the light-loading efficiency.

Figure 4:
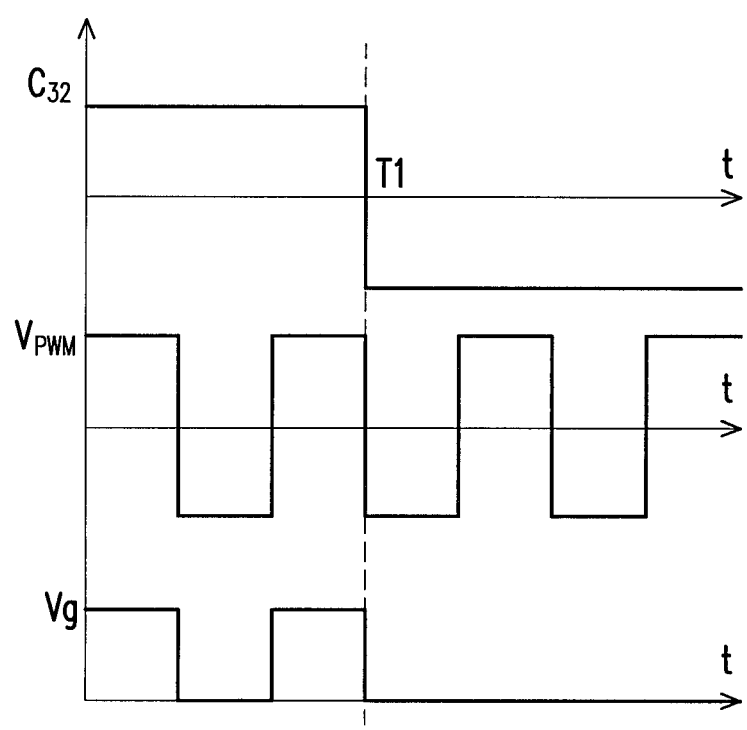
FIG. 4 is a part of operation diagram of the bootstrap gate driver of FIG. 2.

FIG. 4 is a part of operation diagram of the bootstrap gate driver 20 of FIG. 2. Referring to FIGS. 2-4, the load indication signal $C_{32}$, the first control signal $V_{PWM}$ and the voltage Vg on the bootstrap capacitor C are only shown on FIG. 4. Assuming that the load 40 is not in the light-loading state before the timing T1 on the time axis t, the load indication signal $C_{32}$ is in the high level, so the charging path of the bootstrap capacitor C can be established. In this case, the high-side driving path of the switch-transistor circuit 30 is enabled, such that the high-side transistor $Q_H$ is turned on in response to the high voltage Vg when the first control signal $V_{PWM}$ is in the high level; moreover, the high-side transistor $Q_H$ is turned off in response to the low voltage Vg when the first control signal $V_{PWM}$ is in the low level.

On the other hand, assuming that the load 40 is in the light-loading state after the timing T1 on the time axis t, the load indication signal $C_{32}$ is in the low level, so the charging path of the bootstrap capacitor C can not be established. In this case, the high-side driving path of the switch-transistor circuit 30 is disabled, such that the high-side transistor $Q_H$ is continuously turned off in response to the low voltage Vg regardless of that the first control signal $V_{PWM}$ is in either the high level or the low level.

Figure 5:
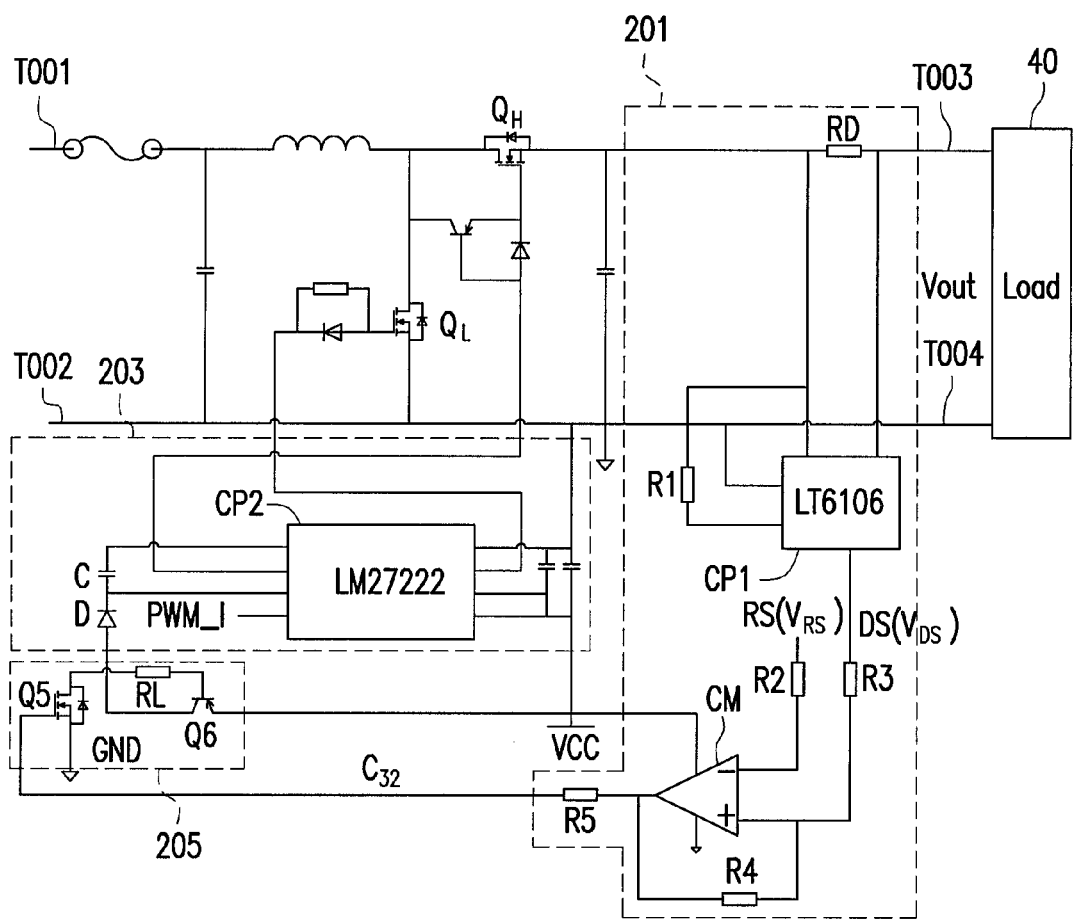
FIG. 5 is an application diagram of the bootstrap gate driver of FIG. 2.

FIG. 5 is an application diagram of the bootstrap gate driver 20 of FIG. 2. Referring to FIGS. 2-5, in this exemplary embodiment, assuming that the bootstrap gate driver 20 is at least suitable for a voltage converter, for example, a boost converter as shown in FIG. 5, but not limited thereto. In other words, the circuit configuration shown in FIG. 5 is a boost conversion topology. To be specific, terminals T001, T002 are input of the boost converter, and terminals T003, T004 are output of the boost converter for supplying an output voltage Vout to the load 40.

As shown in FIG. 5, the high-side transistor $Q_H$ functions as a synchronous rectifier (SR) through the body diode of the high-side transistor $Q_H$, and the low-side transistor $Q_L$ functions as a main switch in the boost converter. A chip CP1 (for example, the integrated chip of LT6106, but not limited thereto) and resistors R1, RD may function as the sample circuit 301; and resistors R2-R5 and a comparator CM may function as the determination circuit 303. A chip CP2 (for example, the integrated chip of LM27222, but not limited thereto) may function as the high-side driving circuit 305, the low-side driving circuit 307 and the signal processing unit 309.

In this case, the chip CP1 can obtain the load current supplied to the load 40 through the resistor RD, so as to detect the state of the load 40 and thus generating the detection signal DS with the voltage level $V_{DS}$ to the determination circuit 303. The determination circuit 303 would compare the detection signal DS with the voltage level $V_{DS}$ to the reference signal RS with the voltage level $V_{RS}$, so as to generate the load indication signal $C_{32}$. The reference signal RS is corresponding to a light-loading reference point. If the detection signal DS with the voltage level $V_{DS}$ is higher than the reference signal RS with the voltage level $V_{RS}$, the output load indication signal $C_{32}$ is in the high level, it represents that the load 40 is not in the light-loading state. If the detection signal DS with the voltage level $V_{DS}$ is lower than the reference signal RS with the voltage level $V_{RS}$, the output load indication signal $C_{32}$ is in the low level, it represents that the load 40 is in the light-loading state.

In case that the load 40 is not in the light-loading state, the transistors Q5, Q6 are simultaneously turned on in response to the load indication signal $C_{32}$ with high level, so the high-side transistor $Q_H$ and the low-side transistor $Q_L$ can be alternately switched under the control of the chip CP2 because the charging path of the bootstrap capacitor C can be established. On the other hand, in case that the load 40 is in the light-loading state, the transistors Q5, Q6 are simultaneously turned off in response to the load indication signal $C_{32}$ with low level, so the high-side transistor $Q_H$ can not be switched under the control of the chip CP2 because the charging path of the bootstrap capacitor C can not be established, but meanwhile, the low-side transistor $Q_L$ can still be switched under the control of the chip CP2.

It should be noted that since the body diode is a one-direction conducting element, so the loop of reactive cycling current is blocked when the load 40 is in the light-loading state. As a result, the boost converter will operate in a discontinuous conduction mode (DCM), so not only no negative inductive current will appear, but also inductive loss and driving loss of synchronous rectifier will be significantly reduced. Consequentially, the light-loading efficiency will be obviously increased.

Besides, even the bootstrap gate driver 20 applied in the boost converter is taken as an example in the above exemplary embodiments, but the application occasion of the bootstrap gate driver 20 is not limited thereto. To be specific, the bootstrap gate driver 20 may be applied in another voltage converter other than the boost converter, for example, a buck converter with SRs, a flyback converter with SRs, a forward converter with SRs, a boost-buck converter with SRs, but not limited thereto. In other words, the application occasion of the bootstrap gate driver 20 can be determined by the real design or application requirement.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A bootstrap gate driver, comprising:
    a load indication unit, configured to generate a load indication signal in response to a state of a load;
    a bootstrap gate-drive unit comprising a bootstrap capacitor, wherein the bootstrap gate-drive unit is configured to drive a switch-transistor circuit in response to an inputted pulse-width-modulation (PWM) signal, and the switch-transistor circuit has a high-side driving path and a low-side driving path; and
    a drive-control unit, coupled to the load indication unit and the bootstrap gate-drive unit, and configured to enable or disable the high-side driving path in response to the load indication signal,
    wherein when the load is in a light-loading state, a charging path of the bootstrap capacitor is not established, so as to disable the high-side driving path,
    wherein when the load is not in the light-loading state, the charging path of the bootstrap capacitor is established, so as to enable the high-side driving path,
    wherein the load indication unit comprises:
        a sample circuit, configured to detect the state of the load by a means of voltage/current sensing, so as to provide a detection signal; and
        a determination circuit, coupled to the sample circuit, and configured to compare the detection signal with a reference signal, so as to generate the load indication signal.

2. The bootstrap gate driver according to claim 1, wherein the switch-transistor circuit comprises a high-side transistor corresponding to the high-side driving path and a low-side transistor corresponding to the low-side driving path, and the bootstrap gate-drive unit comprises:
    a high-side driving circuit, coupled to the high-side transistor, and configured to drive the high-side transistor in response to a first control signal related to the inputted PWM signal;
    a low-side driving circuit, coupled to the low-side transistor, and configured to drive the low-side transistor in response to a second control signal related to the inputted PWM signal, wherein the first and the second control signals are complementary;
    a bootstrap diode, having an anode coupled to an output of the drive-control unit, wherein a first terminal of the bootstrap capacitor is coupled to a cathode of the bootstrap diode, and a second terminal of the bootstrap capacitor is coupled between the high-side transistor and the low-side transistor; and
    a signal processing unit, coupled to the high-side driving circuit and the low-side driving circuit, and configured to receive and process the inputted PWM signal, so as to generate the first control signal and the second control signal.

3. The bootstrap gate driver according claim 2, wherein the high-side driving circuit comprises:
    a first transistor, having a control electrode receiving the first control signal, a first electrode coupled to the cathode of the bootstrap diode and the first terminal of the bootstrap capacitor, and a second electrode coupled to a gate of the high-side transistor; and
    a second transistor, having a control electrode receiving the first control signal, a first electrode coupled to the second electrode of the first transistor and the gate of the high-side transistor, and a second electrode coupled to the second terminal of the bootstrap capacitor, a source of the high-side transistor and a drain of the low-side transistor.

4. The bootstrap gate driver according to claim 3, wherein the low-side driving circuit comprises:
    a third transistor, having a control electrode receiving the second control signal, a first electrode coupled to a system power, and a second electrode coupled to a gate of the low-side transistor; and
    a fourth transistor, having a control electrode receiving the second control signal, a first electrode coupled to the second electrode of the third transistor and the gate of the low-side transistor, and a second electrode coupled to a source of the low-side transistor.

5. The bootstrap gate driver according to claim 4, wherein the first to the fourth transistors are bipolar junction transistors (BJTs).

6. The bootstrap gate driver according to claim 5, wherein the first and the third transistors are NPN-type BJTs, and the second and the fourth transistors are PNP-type BJTs.

7. The bootstrap gate driver according to claim 4, wherein the drive-control unit comprises:
    a fifth transistor, having a control electrode receiving the load indication signal, and a first electrode coupled to a ground potential; and
    a sixth transistor, having a control electrode coupled to a second electrode of the fifth transistor, a first electrode coupled to the system power, and a second electrode coupled to the anode of the bootstrap diode,
    wherein the second electrode of the sixth transistor is served as the output of the drive-control unit.

8. The bootstrap gate driver according to claim 7, wherein the drive-control unit further comprises:
    a current-limiting resistor, coupled between the second electrode of the fifth transistor and the control electrode of the sixth transistor.

9. The bootstrap gate driver according to claim 7, wherein the fifth transistor is an N-type transistor, and the sixth transistor is a PNP-type BJT.

10. The bootstrap gate driver according to claim 7, wherein:
    when the load is in the light-loading state, the load indication signal is in a low level, such that the fifth and the sixth transistors are turned off, and then the charging path of the bootstrap capacitor is not established, so as to disable the high-side driving path; and
    when the load is not in the light-loading state, the load indication signal is in a high level, such that the fifth and the sixth transistors are turned on, and then the charging path of the bootstrap capacitor is established, so as to enable the high-side driving path.

11. The bootstrap gate driver according to claim 2, wherein the signal processing unit comprises:
    a first series-connected level-shift module and logic module, configured to receive and process the inputted PWM signal, so as to generate the first control signal; and
    a second series-connected level-shift module and logic module, configured to receive and process the inputted PWM signal, so as to generate the second control signal.

12. The bootstrap gate driver according to claim 2, wherein the high-side transistor and the low-side transistor are N-type power transistors.

13. The bootstrap gate driver according to claim 1, wherein the bootstrap gate driver is at least suitable for a voltage converter.

14. The bootstrap gate driver according to claim 13, wherein the voltage converter comprises a boost converter.

* * * * *